Figure 2A:
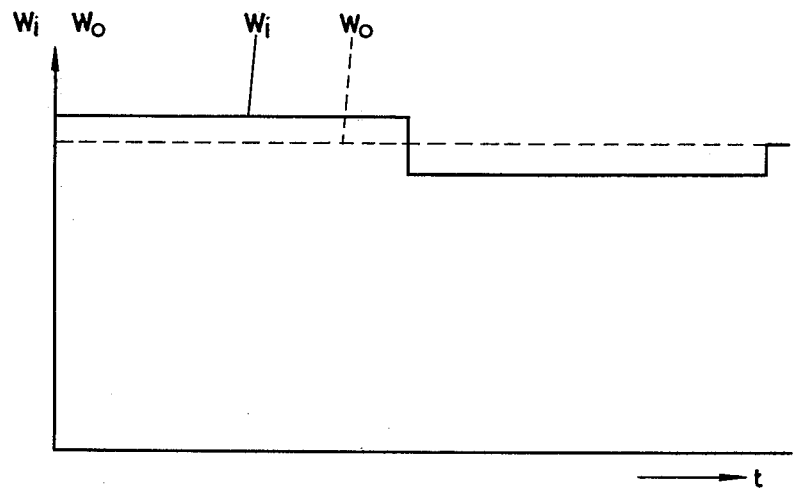

United States Patent [19]

van Langen et al.

[11] 3,964,599
[45] June 22, 1976

[54] PROCESS AND APPARATUS FOR THE CONTROLLING OF THE CONVEYANCE OF LOOSE BULK MATERIAL

[75] Inventors: Jean Marie van Langen, Bergen; Gerardus Wilhelmus Cornelis Jacobs, Alkmaar; Gerrit de Jong, Velsen, all of Netherlands

[73] Assignee: Koninklijke Nederlandsche Hoogovens en Staalfabriken N.V., Ijmuiden, Netherlands

[22] Filed: Sept. 10, 1971

[21] Appl. No.: 179,491

[30] Foreign Application Priority Data
Sept. 10, 1970 Netherlands...................... 7013421

[52] U.S. Cl............................... 198/39; 318/39
[51] Int. Cl.² ...................................... G01G 11/12
[58] Field of Search ................ 198/37, 39; 222/55; 75/3–5; 318/39

[56] References Cited
UNITED STATES PATENTS

| | | | |
|---|---|---|---|
| 2,796,197 | 6/1957 | Criddle | 222/55 |
| 3,139,217 | 6/1964 | Mell | 198/39 X |
| 3,199,793 | 8/1965 | Sabi | 198/37 X |
| 3,236,358 | 2/1966 | Gieskieng | 198/37 |
| 3,412,699 | 11/1968 | Culp et al. | 198/37 X |
| 3,430,751 | 3/1969 | Bateson | 198/37 |

*Primary Examiner*—Evon C. Blunk
*Assistant Examiner*—Richard K. Thomson
*Attorney, Agent, or Firm*—Hall & Houghton

[57] ABSTRACT

Ore pellets are delivered by a conveyor to the chain grate of a continuously operating baking plant, said pellets being supplied to the conveyor from a pellet former at a fluctuating rate independent of the speed of the conveyor. To afford as nearly constant a flow of the pellets to the baking plant as possible, the quantity of pellets about to be delivered by the conveyor at the delivery station is measured, more particularly by measuring the speed of the conveyor and weighing the conveyor load near said delivery station, and is represented by a first signal which is passed through a high-permeable filter and a proportional control means, to provide a second signal which is combined with a signal representative of a belt speed calculated for an average load, and applied to adjust the belt speed in the direction to maintain said flow as nearly constant as possible.

3 Claims, 5 Drawing Figures

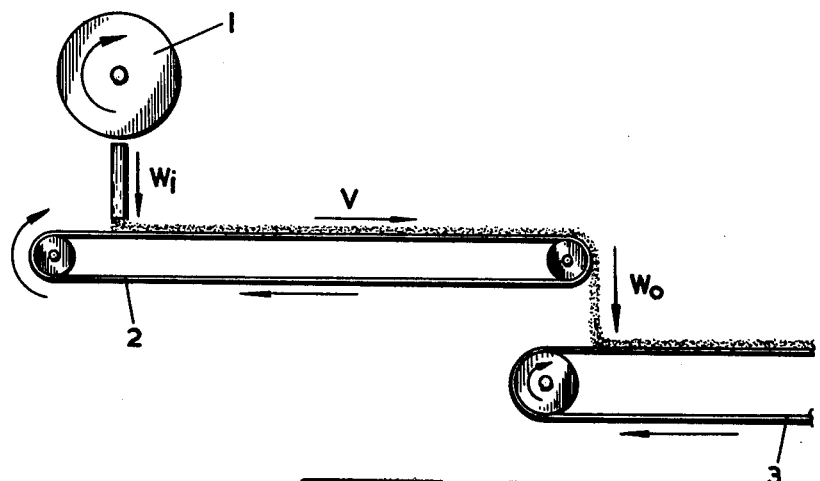
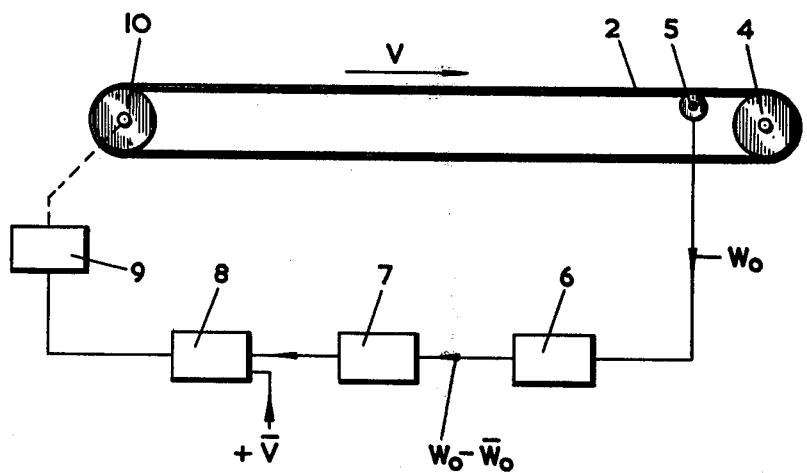

PROCESS AND APPARATUS FOR THE CONTROLLING OF THE CONVEYANCE OF LOOSE BULK MATERIAL

The invention relates to a process and an apparatus for the controlling of the conveyance of loose bulk material which is supplied in a fluctuating quantity and which has to be delivered by a belt conveyor in a flow which is as constant as possible.

In particular the invention relates to the application of said process for the control of the conveyance of unbaked ore pellets which are manufactured in a forming plant from a kneadable mass, substantially consisting of very fine ore powder (ore flour), to a continuously operating pellet baking plant.

The invention will now be explained with reference to said application, although it is by no means limited thereto.

It is remarked that the process and apparatus of the present invention do not cover variable speed conveyor belt feeder control systems as described in U.S. Pat. Nos. 3,430,751 and 2,990,898. This is so because in such systems material is drawn from a hopper by a conveyor belt system, the quantity of the material being mainly depending on the belt speed. By controlling the belt speed it is possible to keep constant the quantity of material withdrawn from the hopper. The length of the belt in such systems is of little influence and usually this length will be chosen short to keep disturbing effects on the control as slight as possible. Contrary to such known processes and apparatus the present invention aims at discharging a flow of material, of which the supply shows considerable fluctuations, as uniformly as possible, independently of the speed of the belt, which solves quite a different problem.

When manufacturing pellets, unbaked, so-called moist or green pellets are formed in rotating dishes or drums. A kneadable mass is continuously fed to said dishes or drums, in a flow which is as constant as possible.

Although as a rule said forming dishes or drums are driven at a constant speed, they will nevertheless often yield a variable quantity of pellets. The fluctuations in the flow of pellets appear to occur periodically, whereby the amplitude and the frequency of said fluctuations vary with the composition of the mass to be formed and with the operating conditions. Experts in the art of manufacturing pellets have not gained a clear insight yet into the cause of said fluctuations and the factors by which they are affected. It is known that the duration of the fluctuations generally varies from 5 to 15 minutes, and that the amplitude thereof varies from 5 to 20% of the average value. In exceptionally unfavorable cases, the deviation of the amplitude from the average value may amount to about 50%. It is remarked that fluctuations in the yield may also occur or may even be increased, when there are fluctuations in the supply of a mass of fine ore powder to the forming dishes or drums. If a fluctuating flow of wet pellets is conveyed to the baking plant to be made into baked ore pellets, this will result in a fluctuating loading of said baking plant.

The baking plant will generally comprise a chain grate which is passed through a furnace in a continuous operation. An uneven load of said grate will result in an uneven permeability of the bed of the pellets to be baked. Consequently, the quality of the baked pellets shows a relatively large irregularity, which renders said pellets less suitable for further transport and as a charge for a blast furnace.

A solution known in the art consists in that the thickness of the bed on the chain grate is kept constant by varying the velocity of the chain grate. This process in its turn gives rise to fluctuations in the drying and baking process of the green pellets, which gives rise again to variations in quality in the baked product. Inasmuch as fluctuations in the load and the velocity of the chain grate make it necessary for said load and said velocity to deviate from the optimum values thereof, the baking plant is not used optimally either.

Furthermore, such a process has appeared to be most difficult to control.

In order to eliminate said disadvantages, solutions have been proposed for building in a conveying and buffering or accumulating system between the forming plant and the baking plant, which system will level off the fluctuations in the flow of green pellets to an acceptable level. Attempts have been made before to realize such a levelling off with the aid of a multiple belt system. Said belt system may, for instance, comprise two, partly overlapping belt conveyors, wherein the green pellets are fed to the upper belt, while the lower belt conveys said mass to the baking plant. By designing the upper belt in such a way that the discharge station thereof is adapted to be displaced in the longitudinal direction of and over the lower belt, a levelling off of a fluctuating flow of pellets is conceivable.

However, it has appeared that in this way a very costly structure is obtained, which is moreover less simple to be controlled from an engineering point of view. Relatively slight variations in the supply of pellets appear to necessitate disproportionately large displacements of the discharge station of the upper belt. The displacement mechanism required for the rearmost point of reversal of said belt, and the resulting large required additional belt lengths will complicate the entire structure to a considerable extent. Furthermore, time delays occur in said control system, which time delays make it hardly possible to achieve a control program for a sufficiently constant loading of the chain grate.

It is furthermore conceivable to use a system wherein two belt conveyors have their longitudinal directions at an angle to each other, and wherein the discharge station of the higher belt on the second and lower belt is displaced by a transverse displacement of the upper belt. Such a solution has similar disadvantages, perhaps even more so, as the solution described above.

It will be apparent from the above considerations that there is an urgent need for a simple solution with which the fluctuations in the flow of pellets, coming from the forming drums or the like, may be sufficiently levelled off during the conveyance through the baking plant. It may be remarked that the building of hoppers in the conveying system for buffering a fluctuating quantity of green pellets is a hardly conceivable process. This is so because the green pellets lack sufficient strength to withstand the pressure to which they are subjected in a storage hopper. Moreover the metering of ore pellets from a hopper may cause them to be damaged. Surprisingly, it has now appeared that according to the present invention there is a very simple solution to the problem generally known in the art.

The present invention consists in that the material to be conveyed from one or more fixed supply point(s) to the discharge station is conveyed and buffered by a single belt conveyor of non-variable length, the velocity of which is controlled in dependency on the quantity conveyed per unit time by said belt conveyor at the delivery station. The object thereof is to aim at a constant value of said quantity conveyed.

Moreover the invention consists in particular in that a kneadable mass, mainly consisting of fine ore powder (ore flour), is, in a continuous process, formed into ore pellets which, by means of the said controllable belt conveyor of non-variable length, are conveyed to a continuously operating baking plant.

It is remarked that the suitability of said solution came as a great surprise to the experts on transport by belt conveyor. This is so because it might be expected that the speed control of the belt conveyor would not be sufficient for the levelling off of the fluctuations to be expected in the supply of green pellets. Belt systems are usually only designed for the conveying of material with a constant delivery, and particularly they are not designed with a buffer capacity for the buffering of the fluctuating quantities of supplied products, such as pellets. If the supply of pellets onto the belt increases, the velocity of said belt will after all have to be reduced, after some running out, in order to maintain a constant delivery of the belt. This results in an additional increase in the supply to the belt per unit length thereof, because of which the velocity of the belt has to be reduced to a greater extent, etc.

Fluctuations in the supply of pellets to the belt, in this way, have an augmented effect on the fluctuations in the load on the belt and on the fluctuations in the velocity of the belt. In this respect the latter fluctuations in the velocity have a notable phase displacement with respect to the fluctuations in the supply, which phase displacement is determined by the nature of the fluctuations and the variable travelling time of the belt.

For these reasons, it is obvious that experts fear that in the system chosen according to the invention there may occur circumstances in which a levelling off of the flow of pellets is either not possible, or in which the fluctuations in said flow are even amplified by said control system.

The fact that such circumstances do not occur may be called remarkable and surprising indeed. It has appeared to the contrary that by applying the new process, a substantially constant supply of pellets to the baking plant has become possible in a most simple and efficient manner.

By applying said process, the efficiency and the capacity of the baking plant could be increased. In this respect it has also appeared that the fear for a further deficiency of the chosen system to be described now was unfounded. It was feared that the great inertia of the belt system would interfere with a rapid adjustment of the velocity to a variable loading thereof, causing undesired phase displacements in said adjustment. The obvious solution to this problem would be to have the velocity of the belt conveyor controlled in advance by means of a control program comprising the mathematical relationship between the discharge and the supply of the pellets, with the measured supply value of the pellets as input data. As will become clear from an explanation following hereinafter, this process would prove to be a considerable complication. In that respect the single speed control system of the belt in dependency of the delivery at the discharge station forms a considerable simplification, which, with the results obtained by means of said control system, appears to be wholly justified.

It is possible to accommodate a pressure measuring device (pressure box) and a tachometer in a single rotatable measuring apparatus, which is positioned against the underside of the belt, the signals of which pressure box and tachometer may be combined to a single signal which is representative of the mass of pellets passing per unit of time. Such measuring apparatus are commercially available. The positioning of such a so-called belt scale just before the end of the belt has the additional advantage that the measured signal precedes the discharging of the measured mass of ore pellets. A delayed response of the belt velocity to said signal is thus somewhat compensated thereby.

The speed control system of the belt must not at all times maintain a constant belt delivery. An increase or decrease in the production, for instance by the connection or disconnection of a forming drum, has to be taken up by the baking plant in the normal manner. Only undesirable fluctuations have to be levelled off.

This condition is met according to the invention if the signal which is obtained by determining the quantity conveyed by the belt conveyor, and which may be termed the "first signal," is fed to a proportional regulator through a high-permeable filter, the output signal of the regulator, which may be termed a "second signal", being added to a signal representative of an appropriate average belt speed, which may be termed a "third signal", to provide a control signal, which may be termed a "fourth signal", which is then fed to a speed adjuster for the adjusting of the rotations per minute of a driving motor of the belt conveyor or of a gear drive between motor and belt conveyor, preferably the former.

At the exit of the high-permeable filter, only the fluctuations about a measured average value of the first signal remain. The average signal and very prolonged variation in level, for instance caused by the connecting or disconnecting of one or more forming drums to the circuit, are retained by said filter. With the aid of the proportioning regulator, all undesirable fluctuations in the measured signal are thereupon controlled to zero. At the exit of said adjuster, there is thus obtained a second signal which may serve to correct the belt speed. By adding a constant signal thereto, which constant signal is representative of the belt speed calculated for a desirable average belt load, a signal is obtained which may serve to adjust the belt drive. This means in practice that with said signal through the speed adjuster the rotations per minute of a variable speed direct current electric motor are adjusted.

A suitable high-permeable filter is an R.C. filter. In this respect it has appeared according to the invention that an undisturbed process is achieved if the time constant of the filter has a value of 3 to 4 times the maximum occurring duration of the fluctuation to be levelled off. It will be apparent that if the time constant is too great, prolonged variations in level will also be levelled off, and this is undesirable.

On the other hand, more and larger fluctuations will permeate to the chain grate if the time constant chosen is too small.

In addition to the process described above, the invention relates to an apparatus for the manufacturing of baked ore pellets, comprising a forming plant for the forming of pellets from a kneadable mass, mainly consisting of very fine ore powder (ore flour), a continuously operating baking plant and a belt conveyor included in a system for connecting the forming plant to the baking plant.

Said apparatus is characterized according to the invention in that the connecting system comprises a single belt conveyor having a non-variable length which extends from the one or more fixed supply station(s) of the forming plant to the station for delivery to the baking plant, and in that it comprises a control system for the determining of the quantity conveyed per unit time by the belt conveyor in the proximity of the discharge station, thereof and the adjusting of the belt speed in dependency thereof.

As previously explained, said apparatus is preferably designed in such a way that the control system includes means for the weighing of the belt load near the delivery end of the belt, for the measuring of the belt speeds, as well as a high-permeable filter with a time constant of about 30 to 60 minutes, a proportional speed control, a rotational speed adjuster and a speed-variable driving motor for the belt conveyor. In this respect it has appeared that for practical purposes a sufficient adjustment may be achieved if the belt conveyor speed is adjustable in a speed ratio of roughly 1 to 3, and if the belt has a maximum loading capacity which amounts to about 2× the average belt load when operating.

The invention will now be more fully explained with reference to the attached drawings, giving by way of example only a possible embodiment of the invention.

FIG. 1 is a diagrammatic representation of the conveying system.

FIG. 2 A—C shows a number of response curves.

FIG. 3 shows a schematic diagram of an adjusting system.

In FIG. 1 reference numeral 1 represents a forming drum in front elevational, which drum rotates in the direction of the arrow. Green ore pellets drop from said drum onto belt conveyor 2, which is driven at a speed V. From belt 2 the material drops onto a chain grate 3, which travels through a baking plant, not shown in the figures.

Now, let us assume that:

$W_i = W_i(t)$ the discharged quantity of pellets from the drum in m³/sec.

$W_o = W_o(t)$ the delivered quantity from the belt in m³/sec.

$F_i = F_i(t)$ the vertical section area of the layer at the beginning of the belt.

$F_o = F_o(t)$ the vertical section area of the layer at the end of the belt l the effective length of the belt $t_1$ the travelling time of the belt over length l.

This means that the behaviour of the plant is determined by the following set of mathematical relationships:

$W_o(t) = V(t) \times F_o(t)$
$W_i(t) = V(t) \times F_i(t)$
$F_o(t) = F_i(t - t_1)$ $$l = \int_0^{t_1} V(t - \tau) d\tau$$

As a desired condition is applicable thereto: $W_o$ = constant.

Notwithstanding the simple aspect of said equations it is in general hardly possible to determine the correlations between the different magnitudes without the use of mathematical auxiliary means such as a computer, some special cases excepted.

Figure 2B:
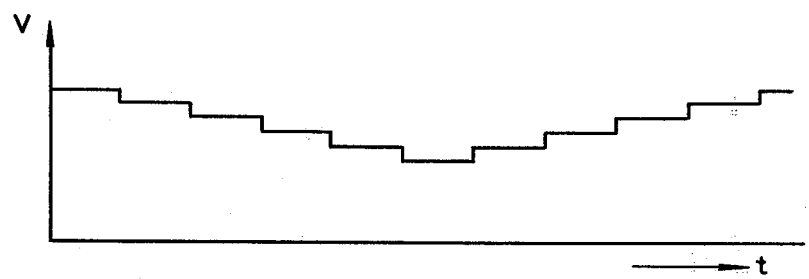
Figure 2C:
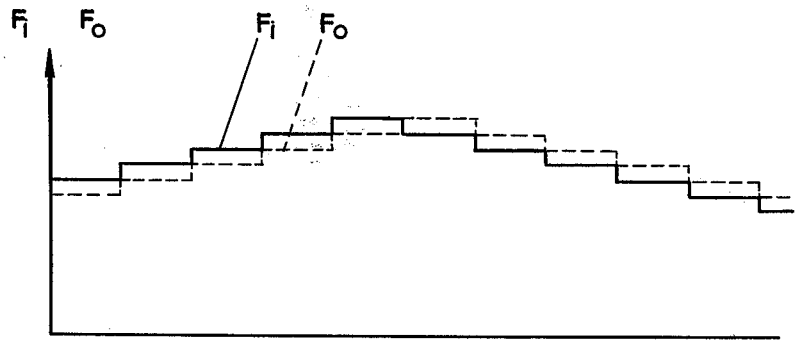

In FIGS. 2a to 2c inclusive such a case is illustrated. It is assumed that the production of a forming drum 1 has increased at a given moment, that after a certain time it decreases until it falls below the original production (see FIG. 2a), and that it finally returns to its zero-level. In FIGS. 2b and 2c is illustrated in what manner said fluctuation in production is levelled off on belt 2, so that the delivery $W_o$ of said belt remains constant.

If the delivery of the forming drum 1 has increased, the thickness of the layer $F_i$ immediately increases at the beginning of the belt. After a travelling period $t_1$ this increased thickness of said layer has arrived at the end of the belt ($F_o$). In order to achieve that the discharge $W_o$ remains constant, the speed V will have to be reduced at that moment. Consequently, by this lower speed, the thickness of the layer $F_i$ (with unaltered delivery $W_i$) increases again at the beginning of the belt 2, which, after a travelling time $t_1$, becomes notable at the discharge end, as a result of which the belt speed V has to be reduced to a further extent, etc. There thus occurs an integrating effect up to the moment at which the delivery $W_i$ decreases, whereupon the argument holds good in the inverted order.

It is to be seen from FIG. 2c that a disturbance in the supply $W_i$ of about 10%, which disturbance lasts through 5 times the travelling time $t_1$, will finally cause the load F on the belt to increase by 5 × 10%. For this reason, the maximum increase in the load F on the belt generally equals the integral of the disturbance in the supply $W_i$.

In FIG. 2b the steep curve of V is illustrated.

In FIG. 3 reference numeral 5 indicates a pair of belt weighing scales. Said scales comprise a roller with a tachodynamo, measuring the speed. A pressure measuring device (pressure box) is also built in in said belt scales. The belt scales are designed in such a way that they are adapted to determine the magnitude $W_o$, and to produce a signal proportional thereto. Through high-permeable filter 6 with a time constant $\tau = 45$ minutes, said signal is passed on to the proportional control means 7. At the exit thereof, said signal is modified by a signal, in the average proportional to V(t), which is added to the output signal of said filter, in addition device 8. In the speed adjuster 9 finally, the resulting signal is turned into a command signal with which the direct current motor 10 is adjusted in speed. Belt 2 is driven by said motor. Good results were obtained in a particular case with range of variability of the belt speed between 0.3 and 1 m/sec.

What we claim is:

1. In a process of conveying loose bulk material by a conveyor belt, which material is supplied to the belt in a fluctuating quantity independent of the speed of the belt, and has to be delivered from the belt in a flow which is as constant as possible, the improvement which comprises:

a. Supplying the material at said fluctuating rate to a single conveying belt having a non-variable length, and conveying the material to a delivery station thereby, b. measuring the quantity of material being carried by the belt per unit of time in a region close to its said delivery station, and deriving from such measurement a first signal representative of said measurement, c. feeding the first signal through a high-permeable filter to a proportion control device to produce a second signal representative of fluctuations in said measurement
d. providing a third signal representative of the belt speed calculated for a desired average belt load, and
e. combining said second and third signals and applying the same to adjust the belt drive in the direction to maintain said flow as nearly constant as possible.

2. The process according to claim 1, characterized in that a kneadable mass, mainly consisting of very fine ore powder (ore flour), is, in a continuous operation, formed into pellets which are conveyed to a continuously operating baking plant by means of the said adjustable belt conveyor of nonvariable length.

3. The process according to claim 1, wherein the high-permeable filter has a time constant of 3 to 4 times the maximum occurring duration of the fluctuation to be levelled off.

* * * * *